United States Patent [19]

Lowell

[11] 4,115,870

[45] Sep. 19, 1978

[54] HAND-HELD DATA PROCESSING TERMINAL

[75] Inventor: Arthur C. Lowell, Newport Beach, Calif.

[73] Assignee: Wordsmith, Inc., Santa Monica, Calif.

[21] Appl. No.: 742,841

[22] Filed: Nov. 18, 1976

[51] Int. Cl.² .................... G07C 1/10; G06F 3/02
[52] U.S. Cl. ........................... 364/900; 364/401; 364/709; 364/710
[58] Field of Search ... 364/200 MS File, 900 MS File, 364/708, 709, 710, 518, 401, 406; 235/152, 156, 61.7 R, 61.9 R, 431

[56] References Cited

U.S. PATENT DOCUMENTS

| 3,792,444 | 2/1974 | Spinner | 340/172.5 |
|---|---|---|---|
| 3,820,080 | 6/1974 | Abrams et al. | 340/172.5 |
| 3,931,614 | 1/1976 | Vasa et al. | 340/172.5 |
| 3,955,355 | 5/1976 | Luce | 235/156 X |
| 3,976,975 | 8/1976 | Cochran | 340/172.5 |
| 3,979,057 | 9/1976 | Katz et al. | 235/156 |
| 3,999,050 | 12/1976 | Pitroda | 239/152 |
| 4,005,388 | 1/1977 | Morley | 340/172.5 |
| 4,016,542 | 4/1977 | Azure | 340/172.5 |

Primary Examiner—Mark E. Nusbaum
Attorney, Agent, or Firm—Poms, Smith, Lande & Glenny,

[57] ABSTRACT

A small lightweight hand-held data processing terminal is provided with several visible field display registers, one entry register, and a keyboard. When used by a route salesman, for example, the salesman initially enters information from the keyboard into the entry register, and then upon verifying that the information is accurate the salesman shifts the information up to the individual field registers which might for example relate to product code information, the number of units which are being purchased or sold, the type of transaction whether it is cash, check, credit card, or the like, and other desired information. The transaction information is initially entered in the entry register and is then shifted up to the appropriate field register. Finally, the customer identification number is entered in the entry register, the entire transactional entry is rechecked visually, and then entered into storage. The hand-held terminal is provided with a CPU (Central Processing Unit) which permits simple mathematical computations such as multiplying the price by the number of units being purchased, giving a suitable discount and the like. The data processing terminal also keeps track of the time of day, and records the time of day as each transaction is entered from the visible display registers into the random access storage of the unit. The keyboard is provided with a recall key to recover the last entered data. Function keys are also provided for selecting other data from storage and displaying it in the field and entry registers from which it was originally obtained.

13 Claims, 9 Drawing Figures

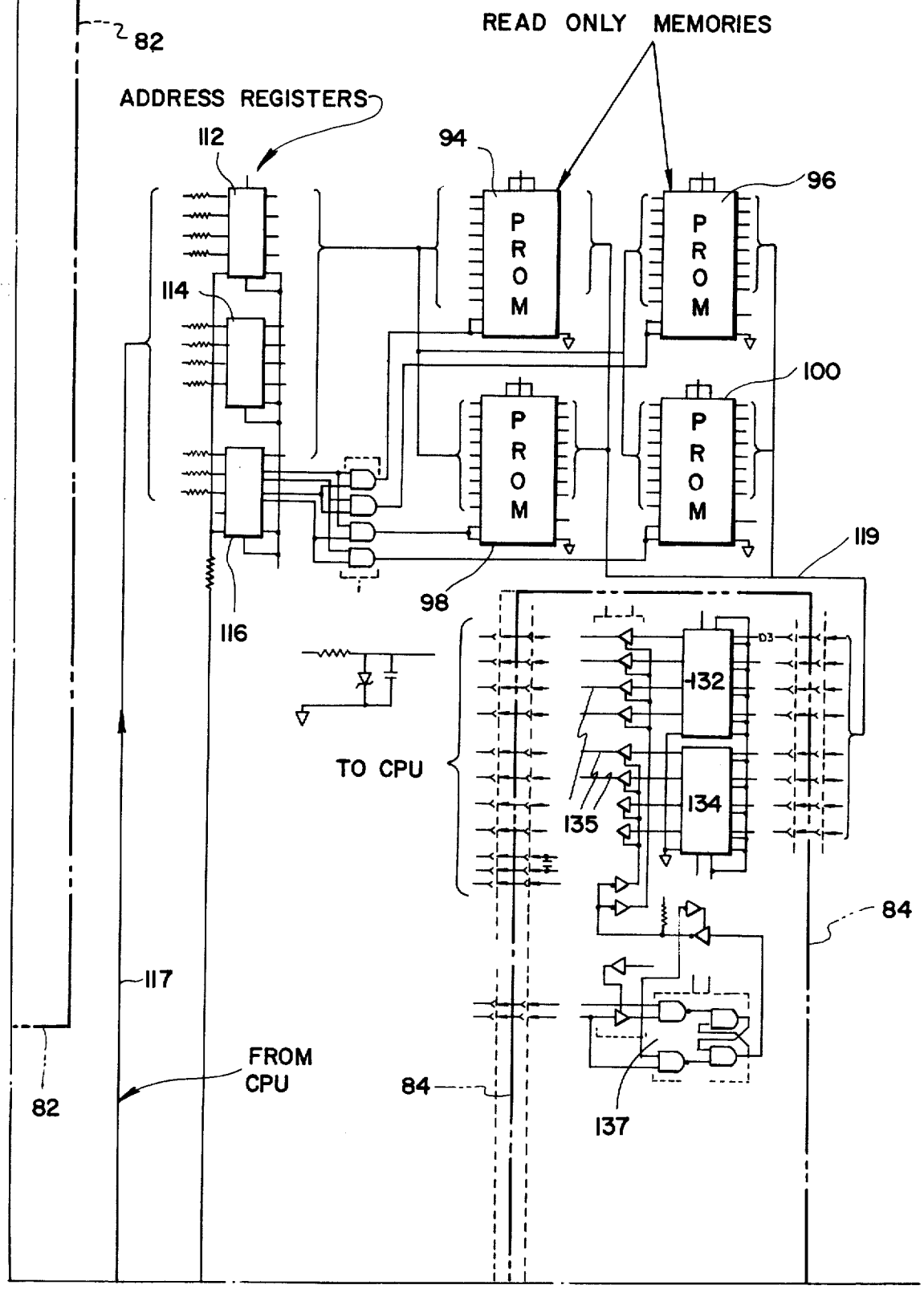

HAND-HELD DATA PROCESSING TERMINAL

FIELD OF THE INVENTION

This invention relates to hand-held data processing terminals.

BACKGROUND OF THE INVENTION

It has been previously proposed to provide data logging apparatus for the use of salesmen, persons who are taking inventory, meter readers, or the like. However, these units have suffered from severe disadvantages in that they have been too heavy, inflexible and subject to entry errors by the persons who utilize them. Two typical units which have been proposed and which appear in the patent literature appear in U.S. Pat. No. 3,932,730 to B. F. Ambrosio granted Jan. 13, 1976; and U.S. Pat. No. 3,942,157 granted to L. L. Azure on Mar. 2, 1976.

SUMMARY OF THE INVENTION

The present invention relates to a lightweight, data processing terminal of the hand-held type having a number of novel and interrelated features which distinguish it from data logging apparatus which have previously been proposed.

In accordance with one important feature of the present invention, the hand-hdld data terminal includes a visible entry register and a series of additional field registers. Information is initially entered from a keyboard into the entry register, and then by separate switching circuits the information is transferred from the entry register up to one of the various field display registers, that it has been verified by the operator in the entry register. In this way the likelihood of making entry errors is greatly reduced. When the unit is employed by a route salesman, for example, the various fields may relate to the type of product, the cost, the goods delivered, the type of transaction such as cash, check, credit card or the like, other desired collateral information, and finally the customer identification.

In accordance with an additional aspect of the invention, following entry of all the desired information in the display registers, an "Enter" key may be depressed on the keyboard, which causes the displayed information to be stored in random access storage, while the display registers are simultaneously cleared.

In accordance with another feature of the invention, arrangements are provided for storing and up-dated the time of day. As information is entered into the random access memory, from the display registers, the time of each of these transactions is also stored. The entry of the time of day may also be employed, together with a key number, as an enabling function prior to making the first entry of the day relating to any particular transaction in the data terminal. Thus, it is only after entering the key number and the time of day, that other transactions may be recorded.

The present hand-held terminal is provided with a CPU for handling mathematical algorithms and other needed logic functions, a random access memory or store, for the storage of entered information, and a read only memory for controlling the sequencing of the data processor to accomplish the functions described above.

Additional features of the present hand-held terminal system include the provision of function keys on the keyboard to permit the recall of desired data from the random access memory, such as the next previous entry or the next prior entry relating to a particular identified customer. The recalled information from the random access memory is, of course, returned to the individual field display registers from which it was derived so that it may be readily identified and interpreted. Suitable data transmission circuitry is also provided for transmitting the stored data to a central processing location, and this equipment is compatible with the conventional telephone modem, and voice grade telephone lines. The keyboard is also provided with a "print" key which in connection with an external printer, permits the printout of displayed information from the various field registers of the data logger.

Arrangements are also provided for initially storing in a portion of the random access memory, background information such as prior sales information and the like, which may be recalled by the salesman by entering suitable "designators" such as the customer number into the entry register and depressing a function key. The hand-held portable terminal may be preloaded with background data or information of the type noted above, over voice grade telephone lines from a central point, preparatory to a route salesman starting his route.

Other objects, features and advantages of the present invention will become apparent from a consideration of the following detailed description and from the accompanying drawings.

BRIEF DESCRIPTION OF THE DRAWINGS

FIG. 4a–d is a complete block circuit diagram showing the blocks which are included in the hand-held terminal of FIG. 1;

Referring more particularly to the drawings, FIG. 1 shows the hand-held data processing terminal 12 in its fully assembled state. Clearly shown in FIG. 1 are the keyboard 14, the entry or lower display 16, the middle display 18, and the upper display 20. It may be noted that the middle display 18 and the upper display 20 are subdivided into various "fields". Thus, of the 8 digits in the middle display 18, a single digit at the far left is reserved for the payment code; the transaction code includes two digits adjacent the payments code; and five digits are reserved for indicating the amount of the transaction.

Figure 1:
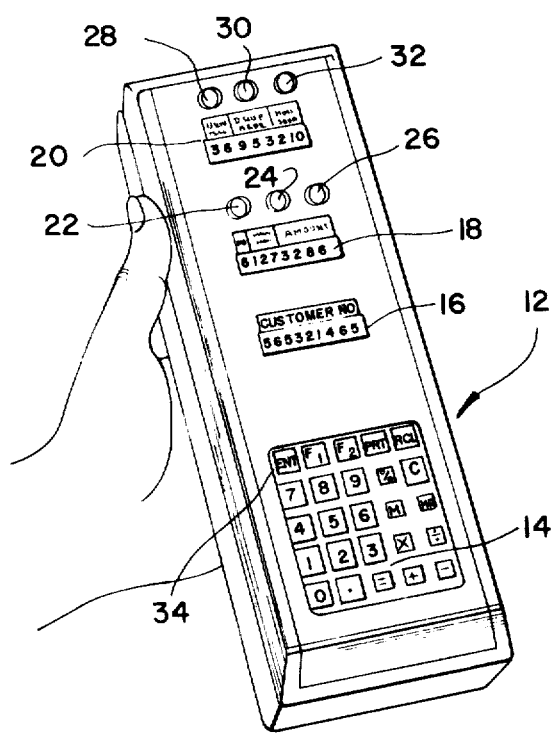
FIG. 1 shows an illustrative hand-held data processing terminal in accordance with the invention to be employed by a route salesman.

The push-buttom switches 22, 24 and 26 are associated with the three fields relating to the payment code, the transaction code, and the amount, respectively, as will be described in more detail below. The upper register 20 is also divided into three fields, with two digits being allocated to the product code on the left side of the display 20, and three digits each being allocated to the "drop quantity" and "pick-up quantity" fields. The three push-buttom switches 28, 30 and 32 are associated with these three respective fields identified above.

In practice, information relating to the various fields is entered by depressing keys on the keyboard 14. The information entered from the keyboard 14 immediately appears in the entry register 16. A selected switch 22, 24, 26, 28, 30 or 32 is then depressed, and the information displayed in the entry register 16 is immediately shifted to the selected field register. After all of the appropriate information has been recorded in the field registers, the customer code number is entered in the entry register 16, and the enter button 34 is depressed. This immediately shifts the information displayed in the three registers into the random access memory, and the registers are cleared to receive the next transaction.

Other functions which may be accomplished with the hand-held terminal will be discussed in more detail below.

Figure 2:
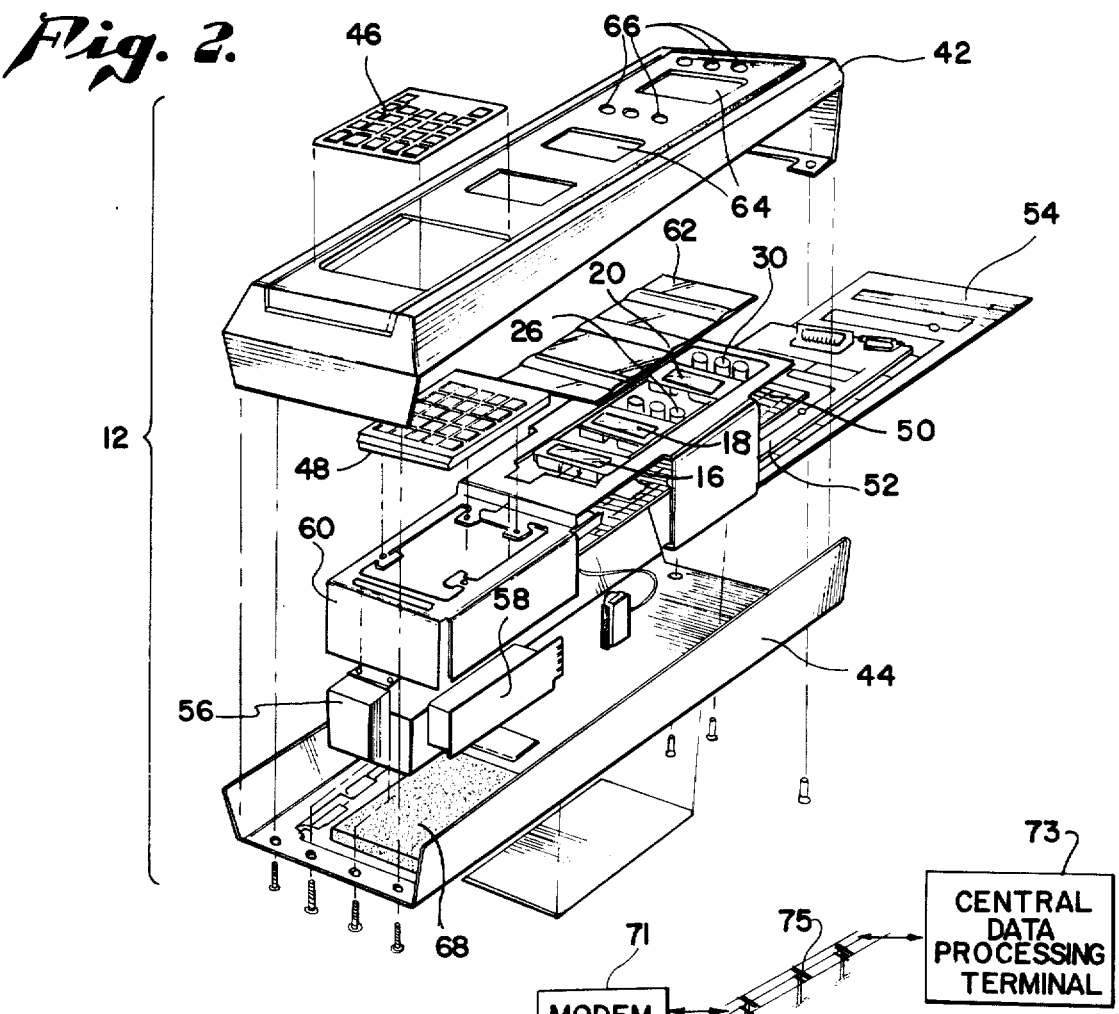
FIG. 2 is an exploded view of the terminal of FIG. 1.

The internal construction of the hand-held terminal will now be considered with reference to FIG. 2. The hand-held terminal as shown in FIG. 2 includes the upper and lower casing members 42 and 44, a bezel or face plate 46, having square openings for receiving the keys of the keyboard assembly 48. The principal electronic modules include the display assembly 50, the control assembly 52, and the memory module 54 which carries the random access memory or "RAM" units. The data logger is powered by a rechargeable battery 56 which operates the converter 58. The chassis 60 serves to hold many of the components mentioned above in their proper relative positions.

It may also be noted that a plastic lens 62 is provided which has cylindrical zones overlying the displays 16, 18 and 20, so that they appear magnified to the observer. The upper portion of the case 42 has windows 64 through which the displays may be seen. In addition, the upper portion of the housing 42 has six small circular openings 66 which receive the field display register push-button switches 22, 24, 26, 28, 30 and 32. A sponge rubber pad 68 is provided below the battery 56 as a shock absorbing element.

Figure 3:
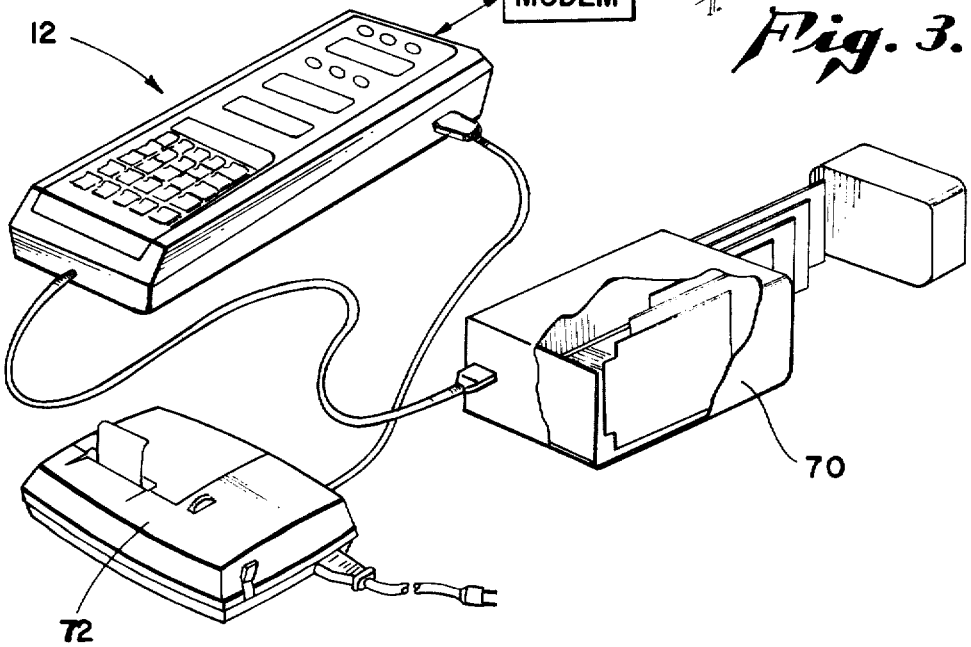
FIG. 3 shows a more complete system including additional random access memory and a printer.

FIG. 3 shows the hand-held terminal system 12 provided with additional random access memory in the form of a memory module 70, and a printer 72 which may provide an immediate printout of the display which appears in displays 16, 18 and 20, or the entire contents of the RAM memories may be printed out when this is desired. The units 70 and 72 are external to the hand-held unit 12, and are primarily intended for applications where greater memory and the capabilities are required. Of course, the unit 12 is self-contained and there is no need for association with the additional memory or with the printer unless these collateral features are desired or required for a particular application.

FIG. 3 also shows a telephone modem 71 for coupling the hand-held terminal 12 to a central data processing terminal 73 via voice grade telephone lines 75. Included within the terminal 12, as will be discussed below, is an input/output serial data controller which implements (1) the transmission of transaction data stored in the memory of the terminal 12 to the central terminal 73, and the transmission of background information from central terminal 73 to the random access store of hand-held terminal 12.

Figure 4A:
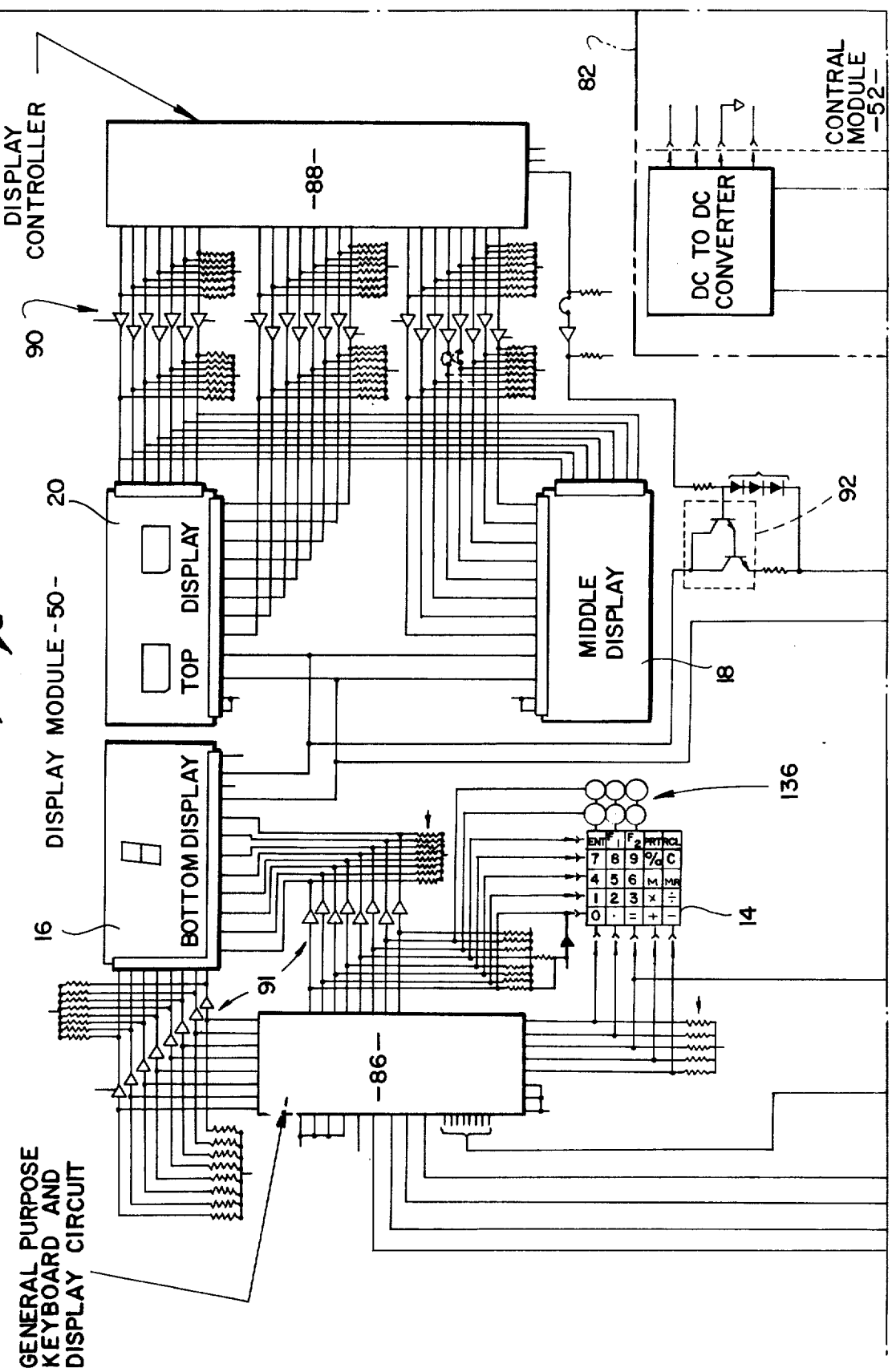
Figure 4B:
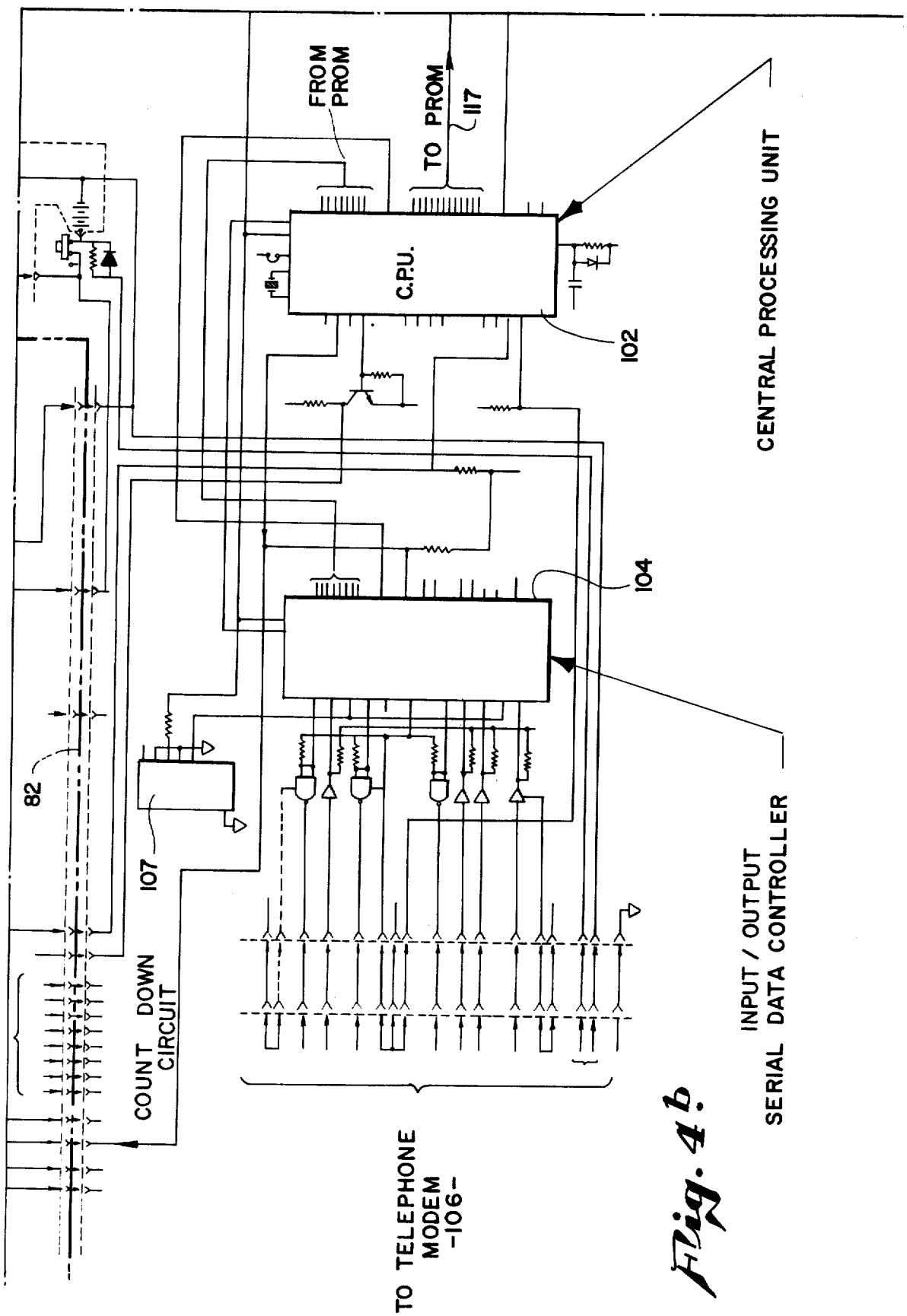
Figure 4D:
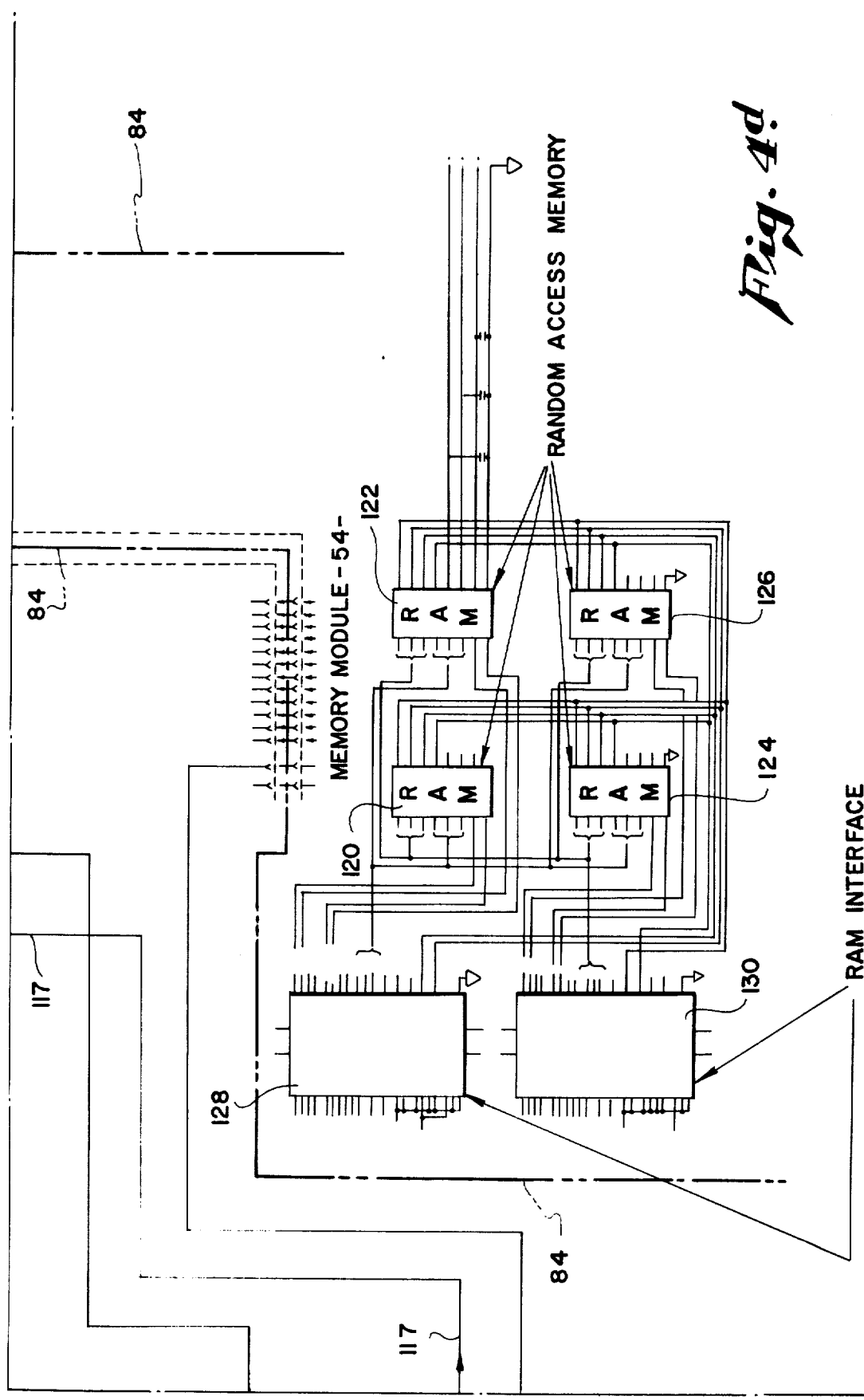

FIG. 4, including FIGS. 4a, 4b, 4c, and 4d on successive drawing sheets, is a block circuit diagram of the hand-held data processing terminal shown in FIGS. 1 and 2. While the block diagram appears to be relatively complex, in reality it is not overly complicated when its relationship to the exploded view of FIG. 2 is examined. More specifically, FIG. 4 is divided by the dash dot lines 82 and 84 into three sections corresponding to modules 50 relating to display, module 52 relating to control, and module 54 relating to the random access memory, as shown in FIG. 2. In FIG. 4 the display module 50 appears in the upper left-hand section, principally in FIG. 4a, and is divided from the control module 52 by the dash dot line 82. Similarly, the memory module 54 is separated from the central control module by the dash dot line 84.

Referring first to the display module which is at the upper left in FIG. 4, note the keyboard 14, the lower display 16, the middle display 8, and the upper display unit 20. Circuitry for controlling the keyboard includes circuit 86 which may be implemented by the General Purpose Keyboard and Display Circuit P/N 10788, dated July 1975 available from the Microelectronic Device Division of Rockwell International, and described in Document No. 10788N40, available from that company; and the Display Controller Circuit 88, which may be implemented by Display Controller Circuit P/N10814, available from the same company and described in their Document No. 10814N40, dated Nov. 1975. The lower or entry display circuit 16 is controlled by keyboard and display circuit 86, and the upper and middle display circuits are controlled by the display controller circuit 88. In the application of control signals from the display controller 88 to the top display 20 and to the middle display 18, the display drivers 90 amplify and supply appropriate power to the energized inputs of the top and middle displays. Similarly, drivers 91 are connected between circuit 86 and the bottom or entry display 16. The transistor circuit 92 is the filament driver circuit for the three displays 16, 18 and 20.

As mentioned above, the control module 52 occupies the lower left and upper right-hand sections of FIG. 4 principally in FIGS. 4b and 4c. In the upper right-hand portion of FIG. 4 are the read-only memories. These programmable read-only memory units 94, 96, 98 and 100 establish the sequence of operations of the logic circuitry of the present data processing terminal. These circuits may be implemented by National Semiconductor programmable ROM circuits, otherwise known as PROMs. These circuits may be erased by the application of ultraviolet light, and reprogrammed electronically as is known in the art. Alternatively, Rockwell type A66 PROMs may be employed.

The central processing unit or CPU 102 is located in the lower left central region of FIG. 4 to the right-hand side of FIG. 4b. It is of course under the control of the CPU 102 that mathematical algorithms and various counting and stepping functions are accomplished, in accordance with sequences established by the PROMs 94, 96, 98 and 100.

Also included in the control module 52 is the Serial Data Controller Circuit 104, which may be implemented by Rockwell Part No. 10930, and which provides two way serial data communication over voice grade telephone or other communication lines. It is described in Rockwell Document No. 10930N40, dated July 1975. The serial data controller 104 permits the transmission of information to and from the random access memory circuitry over a telephone modem to which the data logger unit would be connected at 106. The countdown circuit 107 provides lower frequency clock signals to the SDC circuit 104.

The address registers 112, 114, and 116 receive PROM address instructions from the CPU 102 over bus 117, and the PROMs issue logic instructions to implement the proper sequence of operations on bus 119 which routes logic instructions to the entire hand-held data terminal. The address registers 112, 114 and 116 may be CMOS circuits Part No. CD4042, available from RCA or Harris, for example.

The voltage level shifting circuits 132 and 134 provide the proper voltage levels for compatibility between the PROMs and the bus driver circuits 135. Circuits 132 and 134, together with amplifiers 135 couple the logic instructions from the PROMs to the CPU. Circuits 132 and 134 may be implemented by standard logic circuits of the CD4054 type. The clock decoder circuit 137 insures timely application of PROM instructions from bus 119 to the CPU.

In the memory module 54 are found the four random access memory, or RAM units 120, 122, 124 and 126, together with the associated RAM interface circuitry 128 and 130. The RAM units may be Rockwell P/N1604-8P or 1604-18P, and the RAM interface units may be Rockwell P/N10929.

In practice, on an overall system basis, all of the switches of the keyboard 14, together with the six switches 136 immediately adjacent the keyboard, are periodically sampled at a high rate of speed, under the control of the CPU. When one of the switches is found to be actuated, this information is supplied back to the programmable read only memories via address registers 112, 114, 116, and a series of sequencing instructions are given by the PROMs over bus 119 to control the function of the machine and the distribution of data and its control throughout the hand-held data terminal.

Thus, for example, when a number key is depressed in the keyboard 14, the fact that the keyboard key is depressed is sensed, and the proper number is displayed in the lower or entry display register 16. In addition, the number may be stored in a register in the CPU and in a portion of the random access memory. In due course, additional number keys are depressed to fill up or to partially fill the entry register 16. Then a field display register key S1 through S6 of of Groups 136 is depressed. This fact is in turn sensed by the computer, instructions are given out by the PROMs to energize the appropriate field display register with the number which has been stored in a register in the CPU and in a portion of the RAM, or random access memory.

Additional operational sequences of the present system will be discussed below, in part in connection with FIGS. 5 and 6 of the drawings.

Figure 5:
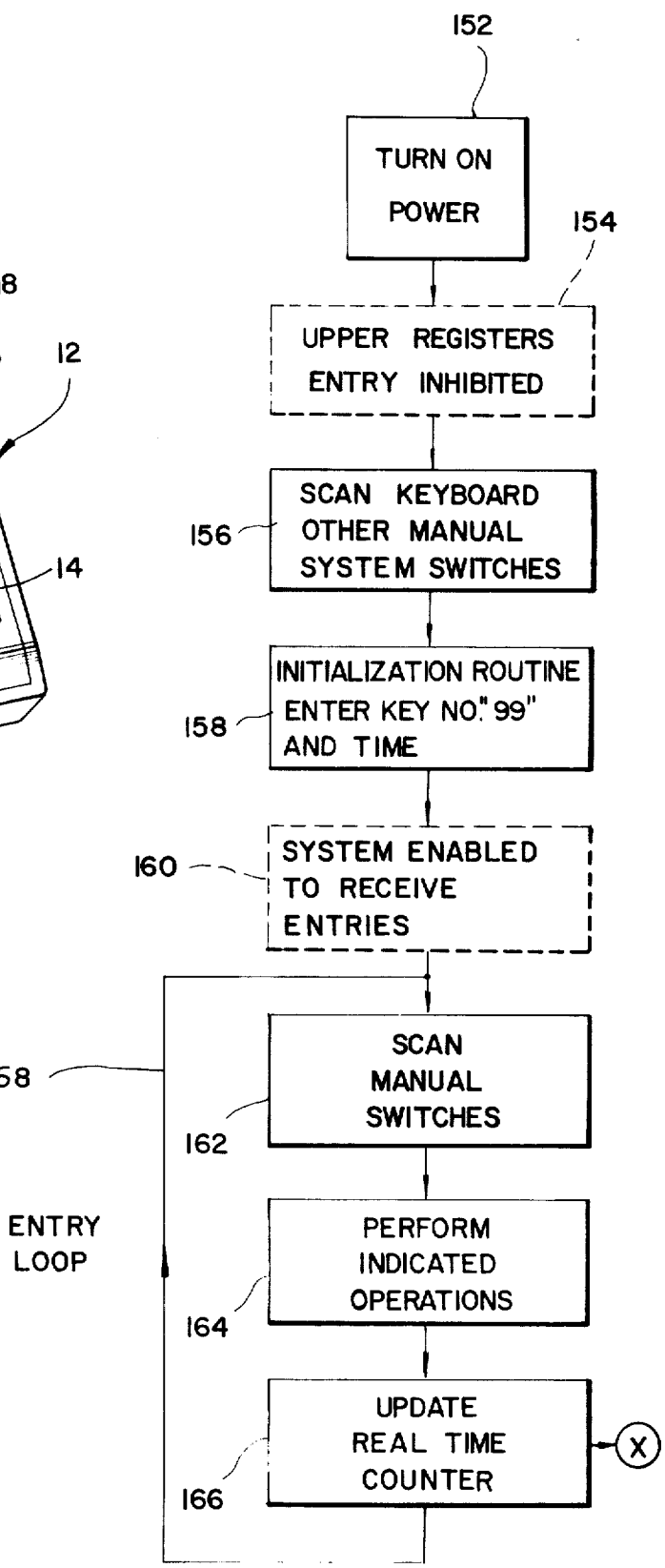
FIG. 5 is a sequence diagram showing the initialization sequence for the present terminal.
Figure 6:
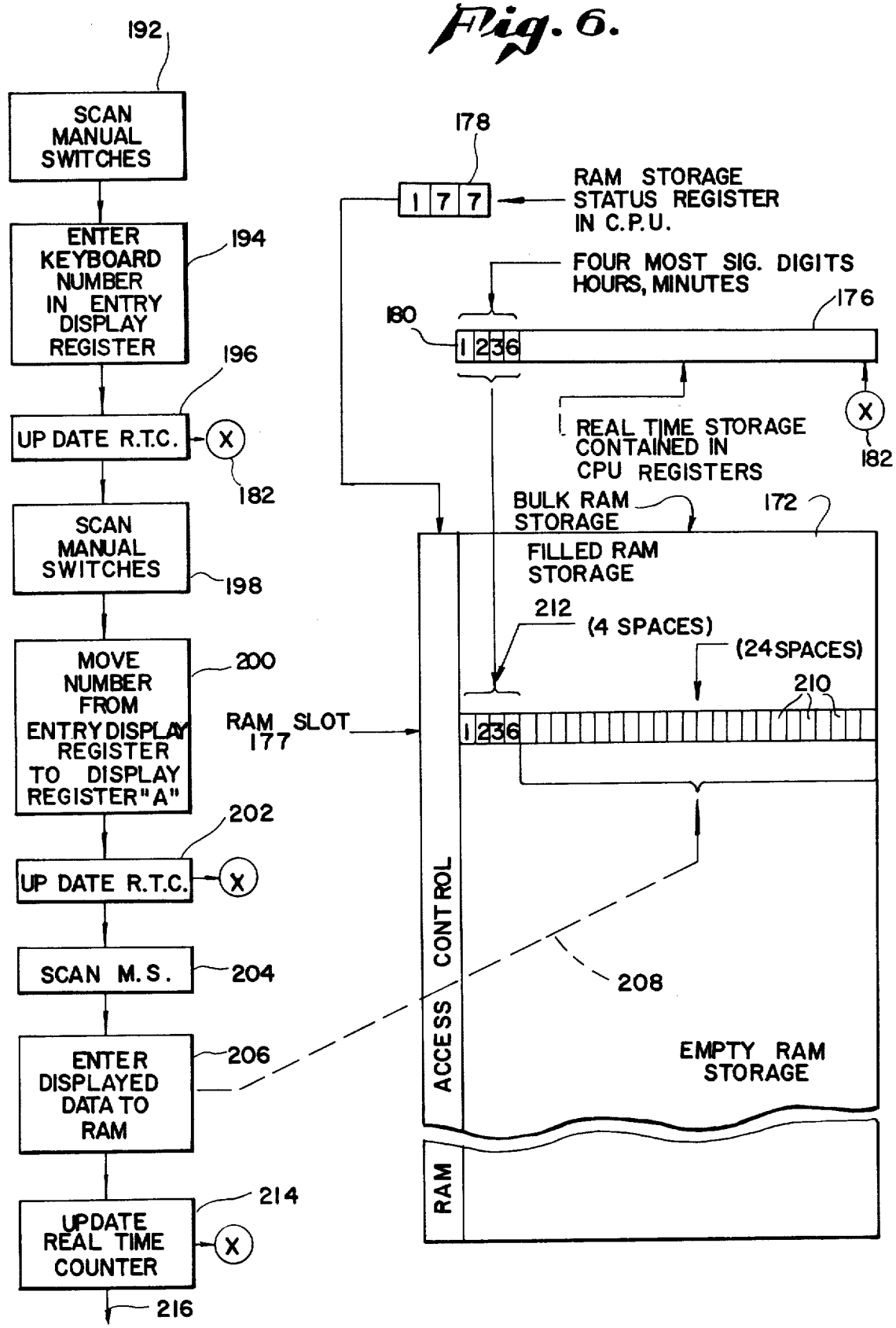
FIG. 6 is a diagram showing the sequence for entering data from the display registers and the time of entry into the random access memory.

FIGS. 5 and 6 show diagrammatically certain sequences accomplished by the hand-held data processing terminal of the present invention. In the diagram of FIG. 5 the upper block 152 indicates the initial turn-on of power of the unit. The dashed line block 154 indicates that, following the initial turn-on of power, the upper or field registers 18 and 20 will not accept entries. Block 156 indicates the systematic mode of operation of the present system whereby the keyboard and the various manual switches including the field entry switches are scanned and, depending on which keys have been energized, the data processing system is instructed by the PROMs to take a series of actions.

The initialization routine involves the entry of the number "99" and the time of day. This initialization step is indicated by block 158. More particularly, the number 99 is initially entered into the entry display register 16. Then the push-button switch 28 normally relating to the two-digit product code is depressed bringing the number 99 to the product register. The operator next enters four digits representing the time in hours and minutes, and pushes the enter key. As indicated by the dashed line block 160 in FIG. 5, the system is now enabled to receive entries, with the two displays which carried the number 99 and the time of day being blanked upon the depressing of the enter key.

The regular sequence of the data processing terminal is then undertaken, and this includes the three steps indicated by the three blocks 162, 164, and 166 which is continuously repeated as shown by the loop 168. The first two steps 162 and 164 involve the scanning of the manual switches as discussed above and the performing of the indicated operations under the control of the programmable read-only memories. Step 166 is designated "up-date real time counter" and the symbol "X" indicates that the counter associated with the calculation of the current time is stepped forward, or advanced. This feature will be discussed in greater detail in connection with FIG. 6.

In FIG. 6 a program sequence is indicated along the left-hand side of the drawing, and to the right are indicated the bulk RAM storage 172, the RAM access control circuitry 174, a real time storage register 176 which may be included in the CPU, and a pointer register 178 indicating the number or address of the next vacant or empty storage location within the random access store. Incidentally, the numbers in the RAM and in the CPU are indicated s being decimel numbers. Of course, in actuality, the numbers in the present data processing system are all binary numbers, and four binary numbers are allocated to present each decimal digit. Accordingly, in each place in FIG. 6 where a decimal number is shown, this actually represents four binary storage spaces.

As mentioned above, the time is entered into the hand-held data process terminal as part of the initialization sequence. This time is entered into the four most significant digits 180 of the register 176 which is located in the CPU. As mentioned in connection with FIG. 5, the real time storage register or counter in the CPU is periodically advanced. This is indicated by the input "X" labelled by the reference numeral 182 at the far right of the storage register 176. After the storage register or counter 176 receives a number of impulses "X", the least significant digit in the time 12:36 will be advanced by one unit so that the time will thereafter read 12.37. Each minute thereafter, a count will have been made by the repeated impulses applied to the storage register 176 so that the time designation will be advanced by another minute.

Returning to the sequence of operations indicated along the left-hand side of FIG. 6, the upper block 192 shows the scanning of the manual switches, and the second block 194 indicates the entry of keyboard numbers into the entry display register 16. Block 196 indicates the periodic updating of the real time counter by applying a count to point 182 which is the least significant digit of register 176. Block 198 indicates that the manual switches are again scanned, and block 200 indicates that one of the field register switches, such as switch 22 or 28, for example, has been depressed and accordingly the number is moved from the entry register up to the appropriate field register. The next step in the cycle as determined by sequence instructions from the PROM, is to update the real time counter, as indicated by block 202 indicating, by the symbol "X", stepping forward of the register 176. Blocks 204 and 206 indicate that the manual switches are again scanned and that the "enter" key on the keyboard 14 has been depressed. This causes the 24 decimal digits displayed on the visual display of the present hand-held unit to be transferred into random access storage, as indicated by the dashed line 208 shown directed toward the 24 decimal spaces (each including four binary memory spaces) 210 in the bulk RAM storage.

The particular location for entry of the displayed information is determined by the "pointer" register 178 which operates through the RAM access control circuitry 174. It may also be noted that the time, which happens to be 36 minutes past 12, is entered into four spaces of the random access memory 212, in combination with the 24 decimal digits from the display. These 28 decimal digits, or 112 binary digits constitute a single block of information corresponding to a single transaction which is entered from the display into storage together with the time of entry.

The final step in the sequence shown in FIG. 6 is indicated by block 214, and again involves updating of the real time counter. The arrow 216 indicates that, of course, the sequence will continue with additional scanning of the manual switches and the ultimate entry of additional transactions.

For completeness and to ensure that one skilled in the art will be able to practice the present invention, reference is made to three additional substantial publications of the Microelectronic Device Division of Rockwell International, P.O. Box 3669, 3310 Miralloma Avenue, Anaheim, California 92803. These are the overall system manual for use with the electronic components shown in FIG. 4, entitled "PPS Devices, Electrical and Mechanical Specifications", Document No. 29480N10, dated October 1975; the PPS-4 Microcomputer Programming Manual, Document No. 29400N31, dated October 1974; and PPS-4 Microcomputer Basic Devices Product Description, Document No. 29003N40, dated May 1976. These three publications will enable one skilled in the art to practice the invention as described in the present specification.

It will be appreciated that the present invention has been described in terms of one particular set of electronic logic circuits, but that it could also be implemented through the use of other comparable building blocks by one skilled in the art. Further, minor modifications and variations such as the inclusion of additional memory or alternaive logic arrangements, or additional display is well within the scope of one skilled in the art.

What is claimed is:

1. A hand-held data processing and data logging terminal system comprising:
   a plurality of field registers, and a corresponding plurality of associated visible display means for exhibiting the data included in each said field register;
   an entry register and a corresponding associated visible display means for exhibiting numbers included in said entry register; said entry register and associated visible display means being separate from said field registers and associated displays;
   a keyboard;
   means for entering data from said keyboard into said entry register, and concurrently displaying said data in said associated visible display;
   a plurality of individual switching means mounted on the face of said hand-held data processing system and adjacent each of said field registers for selectively shifting information from said entry register directly into the selected one of said field registers for immediate display in the visible display associated with each field register;
   housing means for mounting said registers, display means, keyboard, data shifting means and switching means into a lightweight hand-held unit;
   a memory unit;
   means for entering information stored in said field registers into said memory unit;
   means for initially entering a key predetermined multidigit number and a number indicating the time of day into said entry register;
   means for continuously updating said time of day information;
   decoding means responsive to the entry of said predetermined multidigit number and said number representing the time of day for enabling the transfer of information from said field registers to said memory unit; and
   means for automatically storing said time of day information with information transferred from said field registers to said memory unit.

2. A system as defind in claim 1 further comprising:
   switching means for storing all of the data displayed in said registers, and simultaneously clearing said visible displays.

3. A system as defined in claim 2 further comprising random access memory means for receving and storing said data.

4. A system as defined in claim 1 further comprising:
   means for initially shifting data from said entry register to a first one of said field registers and displaying said data in the visible display associated with said first field register;
   means for making additional entries into said entry register while said initial data remains displayed in said display associated with said first field register; and
   means for subsequently shifting the newly entered data from said entry register to a second one of said field registers and displaying the newly entered data in the display associated with the second field register while continuing to display the initial data in said display associated with said first field register.

5. A data logging system as defined in claim 2 further comprising:
   means for recalling selected data from storage and displaying said data in the respective field display means from which the data was drawn.

6. A system as defined in claim 5 including means for entering data into said entry register; and means for recalling and displaying information which has previously been stored based on the data entered in said entry register.

7. A system as defined in claim 1 further comprising:
   central processing unit means for performing arithmetic operations on information entered in said data logging system;
   read only memory means for controlling the sequence of operation of said data processing terminal system; and
   random access memory means for storing information from said visible displays.

8. A system as defined in claim 2 further comprisng:
   means for sequentially transmitting all of the data stored in said data processing terminal system to an external circuit for processing.

9. A system as defined in claim 1 wherein said keyboard includes numerical keys, mathematical algorithm keys, an entry key, a memory recall key, and a clear key.

10. A system as defined in claim 1 further comprising: a separate printer, and switching means on said keyboard for implementing printout of the displayed information.

11. A system as defined in claim 3 further including data controller circuit means for receiving information from said random access memory means and transmitting it over voice grade telephone lines to a remote central terminal.

12. A system as defined in claim 3 further including data controller means for receiving data from a remote central terminal and storing said data in said random access memory means.

13. A system as defined in claim 12 further including function key means for recalling selected data stored in said random access memory means in accordance with designation data, and displaying the recalled data.

* * * * *